(No Model.)

F. H. FERGUSON.
COOKING UTENSIL.

No. 405,087.   Patented June 11, 1889.

Witnesses:
Geo. J. Buchheit Jr.
Theo. L. Popp.

Fred. H. Ferguson Inventor
By William H Bonner
Attorneys

UNITED STATES PATENT OFFICE.

FRED H. FERGUSON, OF BUFFALO, NEW YORK.

COOKING UTENSIL.

SPECIFICATION forming part of Letters Patent No. 405,087, dated June 11, 1889.

Application filed October 8, 1888. Serial No. 287,522. (No model.)

*To all whom it may concern:*

Be it known that I, FRED H. FERGUSON, of the city of Buffalo, in the county of Erie and State of New York, have invented a new and useful Improvement in Cooking Utensils, of which the following is a specification.

This invention relates to that class of cooking utensils which consist of an inner pan or vessel designed to contain the food to be cooked, and an outer inclosing-pan which is separated from the inner cooking-vessel by an air space or chamber, whereby the inner vessel is kept out of contact with the fire or direct heat and burning or scorching of the food is prevented.

The object of my invention is to produce a utensil of this character which shall be simple in construction and which can be manufactured at small cost.

My invention consists to that end of the improvements which will be hereinafter fully described, and pointed out in the claim.

Figure 1:
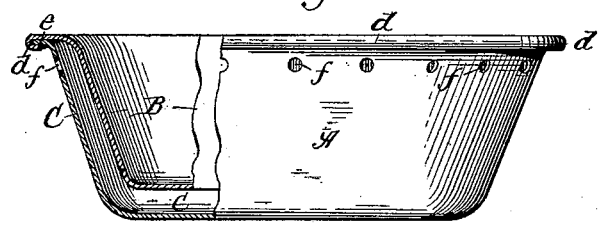
Figure 2:
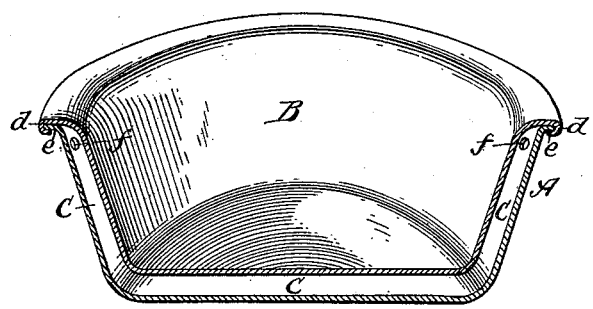

In the accompanying drawings, Figure 1 is a perspective view, partly in cross-section, of my improved cooking utensil. Fig. 2 is a sectional perspective view thereof.

Like letters of reference refer to like parts in both figures.

A represents the outer inclosing-pan, which is exposed to the fire or direct heat, and B is the cooking vessel or pan arranged within the outer vessel A. The inner cooking-vessel is considerably smaller than the outer pan, and the bottom thereof is arranged a short distance above the bottom of the outer pan, so as to form an air space or chamber C between the walls of the two vessels, and also underneath the bottom of the cooking-vessel. The two vessels are permanently and rigidly secured together by means of a marginal flange *d*, arranged at the upper edge of the inner cooking-vessel B, and bent or folded over a projecting rim or bead *e*, formed at the upper edge of the outer vessel A, as clearly shown in the drawings. This construction forms a neat, simple, and cheap fastening, which leaves no cavities in which dirt, &c., may lodge.

The inner cooking-vessel is preferably constructed of sheet-tin, and the outer pan A, which is exposed to the direct heat, of light sheet-iron.

*f* represents a series of air-openings formed in the outer pan A, through which the heated air may escape from the air-chamber C, so as to prevent straining and warping of the vessels by the expansion of the air, which would occur in the absence of these openings. The openings *f* extend entirely around the pan A, and are arranged near the upper edge thereof, so as to be out of reach of the flames when the utensil is placed over the fire, and thereby prevent the flames from entering said openings and coming in contact with the inner cooking-vessel.

My improved utensil is composed of two ordinary pans fastened one within the other, and it therefore forms a very simple and compact device involving comparatively little labor and expense in its production.

The utensil is especially desirable for boiling vegetables, rice, oatmeal, and similar dishes, but may also be employed for baking purposes, if desired. In either case all liability of burning the food is obviated.

I am aware that a cooking utensil composed of an inner vessel and an outer vessel permanently secured together with a chamber between the walls and bottoms of the two vessels is not new, and such construction I do not claim; but

I claim as my invention—

A cooking utensil composed of two similarly-shaped pans or vessels A B, arranged one within the other, with a closed chamber or air-space C formed between the walls and bottoms of the two vessels, both vessels being rigidly secured at their upper edges by the flange of the inner vessel being bent or folded over and under the flange or rim of the outer vessel, the outer vessel being provided with a series of air-escape openings *f*, arranged close to the upper edge of the pan, substantially as set forth.

Witness my hand this 29th day of September, 1888.

FRED H. FERGUSON.

Witnesses:
C. F. GEYER,
FRED C. GEYER.